United States Patent [19]

Iwatsuki

[11] Patent Number: 4,781,080
[45] Date of Patent: Nov. 1, 1988

[54] HYDRAULIC PRESSURE CONTROL DEVICE IN AUTOMATIC TRANSMISSION

[75] Inventor: Kunihiro Iwatsuki, Toyota, Japan

[73] Assignee: Toyota Jidosha Kabushiki Kaisha, Japan

[21] Appl. No.: 942,071

[22] Filed: Dec. 15, 1986

[30] Foreign Application Priority Data

Jan. 7, 1986 [JP] Japan .................. 61-001165

[51] Int. Cl.$^4$ ............................. B60K 41/06
[52] U.S. Cl. ...................................... 74/867
[58] Field of Search ............... 74/867, 866; 364/424.1

[56] References Cited

U.S. PATENT DOCUMENTS

| | | | |
|---|---|---|---|
| 3,748,926 | 7/1973 | Mohri et al. | 74/866 X |
| 4,106,367 | 8/1978 | Bouvet | 74/866 |
| 4,283,970 | 8/1981 | Vukovich | 74/866 |
| 4,388,845 | 6/1983 | Kishi et al. | 74/866 X |
| 4,502,354 | 3/1985 | Suzuki et al. | 74/866 |

FOREIGN PATENT DOCUMENTS 56-125555  2/1980  Japan .
56-24246   3/1981  Japan .
56-49450   5/1981  Japan ................................. 74/866
58-38186   8/1983  Japan .

Primary Examiner—Leslie A. Braun
Assistant Examiner—Dwight G. Diehl
Attorney, Agent, or Firm—Parkhurst, Oliff & Berridge

[57] ABSTRACT

A hydraulic pressure control device in an automatic transmission, provided thereon with a mechanism capable of regulating oil pressure in response to a command value from a calculating device, including: a device for detecting oil pressure in the hydraulic pressure control device; a device for comparing the oil pressure thus detected with a target value; and a device for correcting the command value from the calculating device in accordance with the result of the comparison, wherein the oil pressure actually generated in the hydraulic pressure control device is directly detected, and the command value to control the oil pressure is corrected while the oil pressure thus detected is compared with an ideal value (a target value). With this arrangement, highly accurate oil pressure control can be continuously carried out, irrespective of variations peculiar to a mechanical system and variations in use conditions.

13 Claims, 8 Drawing Sheets

FIG. 3

| SHIFT POSITION | | C1 | C2 | C0 | B1 | B2 | B3 | B0 | F1 | F2 | F0 |
|---|---|---|---|---|---|---|---|---|---|---|---|
| P | | | | ○ | | | | | | | |
| R | | | ○ | ○ | | | ○ | | | | |
| N | | | | ○ | | | | | | | |
| D | 1 | ○ | | ○ | | | | | | ◎ | ◎ |
| D | 2 | ○ | | ○ | | ○ | | | ◎ | | ◎ |
| D | 3 | ○ | ○ | ○ | | ○ | | | | | ◎ |
| D | 4 | ○ | ○ | | | ○ | | ○ | | | |
| 2 | 1 | ○ | | ○ | | | | | | ◎ | ◎ |
| 2 | 2 | ○ | | ○ | ○ | ○ | | | ◎ | | ◎ |
| 2 | 3 | ○ | ○ | ○ | | ○ | | | | | ◎ |
| L | 1 | ○ | | ○ | | | ○ | | | ◎ | ◎ |
| L | 2 | ○ | | ○ | ○ | ○ | | | ◎ | | ◎ |

| θ | APL₀ Kg/cm² | | ΔP₀ | |
|---|---|---|---|---|
| | 1st SPEED | 2,3,4 th SPEEDS | 1st SPEED | 2,3,4 th SPEEDS |
| $\theta_7$ | 9.6 | 8.0 | 0.3 | 0.25 |
| $\theta_6$ | 9.0 | 7.5 | ↑ | ↑ |
| $\theta_5$ | 8.4 | 7.0 | ↑ | ↑ |
| $\theta_4$ | 7.8 | 6.5 | 0.2 | 0.15 |
| $\theta_3$ | 7.2 | 6.0 | ↑ | ↑ |
| $\theta_2$ | 6.6 | 5.5 | ↑ | ↑ |
| $\theta_1$ | 6.0 | 5.0 | ↑ | ↑ |
| $\theta_0$ | 4.5 | ← | ↑ | ↑ |

HYDRAULIC PRESSURE CONTROL DEVICE IN AUTOMATIC TRANSMISSION

BACKGROUND OF THE INVENTION

1. Field of the Invention

This invention relates to a hydraulic pressure control device in an automatic transmission, and more particularly to improvements in a hydraulic pressure control device in an automatic transmission provided thereon with a mechanism capable of regulating control oil pressure in response to a command from calculating means, the hydraulic pressure control device being suitable for use in an electronic automatic transmission for a motor vehicle.

2. Related Art

There has been widely known an automatic transmission for a motor vehicle, wherein a gear transmission mechanism and a plurality of frictionally engaging devices are provided, and a hydraulic pressure control device is operated to selectively change over the engagements of the frictionally engaging devices, to thereby achieve any one of a plurality of gear stages.

In general, each frictionally engaging device is comprised of two sets of friction disc elements which are relatively movably supported, and a hydraulic pressure servo device for driving the friction disc elements. When oil pressure is supplied to the hydraulic pressure servo device, the two sets of friction disc elements are strongly urged against each other, whereby the two sets of friction disc elements can be connected to each other in a manner to transmit torque therebetween.

The above-described basic oil pressure to the frictionally engaging devices is referred to generally as line pressure or line oil pressure. This line oil pressure has heretofore been regulated by introducing throttle oil pressure, variable as commensurate to a throttle opening (representing an engine load), to a control port of a primary regulator valve for controlling the line oil pressure. Furthermore, in general, this throttle oil pressure has heretofore been generated by a throttle valve, in which the resilient force of a spring, increased commensurately to a depression value of an accelerator pedal, is rendered to a spool thereof.

In recent years, electronic automatic transmissions have been developed wherein an electronic circuit forms a main portion of a control circuit. In such control circuits, information on the throttle opening has been processed in the form of an electronic signal. Specifically, a device has been developed such that the line oil pressure is controlled in response to an electronic signal relating to the throttle opening (For example, Japanese Utility Model Kokai (Laid-Open) No. 125555/1981).

With the line oil pressure or the throttle oil pressure controlled in response to a command value from a computer (calculating means) as described above, precise control has become possible. For example, during non-shift running the line oil pressure is controlled and regulated as low as possible commensurate to an engine load, a vehicle speed and the like, with a suitable margin of safety being provided, so that wasteful power loss in an oil pump can be avoided.

However, when the oil pressure in the hydraulic pressure control device is controlled in response to a command value from the computer in accordance with signals inputted from various sensors as described above, even as accurately as the electronic system functions, a problem still remains that control as precise as is desirable is not possibly carried out. Since the subject to be controlled is an oil pressure system (a mechanical system), variations peculiar to the machine system such as dimensional variations of the pressure regulating valve, variations in the spring constant of a return spring and variations in use conditions such as oil temperature, cannot be avoided.

SUMMARY OF THE INVENTION

The present invention has been developed to obviate the above-described disadvantages of the prior art and has as its object the provision of a hydraulic pressure control device in an automatic transmission, wherein, irrespective of variations in the oil pressure system, oil pressure control intended for use in individual automatic transmissions can be constantly and accurately carried out.

To achieve the above-described object, the present invention contemplates, as the technical gist thereof is shown in FIG. 1, a hydraulic pressure control device in an automatic transmission provided with a mechanism capable of regulating oil pressure by a command value from calculating means including: means for detecting oil pressure in the hydraulic pressure control device; means for comparing the oil pressure thus detected with a target value; and means for correcting the command value of the calculating means in accordance with the result of the comparison.

According to the present invention, the oil pressure actually generated in the hydraulic pressure control device is directly detected and the command value from the calculating means to control the oil pressure is corrected. Specifically, the oil pressure thus detected is compared with an ideal value (a target value) determined in a manner later described, so that oil pressure in the hydraulic pressure control device can be accurately maintained at a desired value in cooperation with the highly reliable command value from the computer. Oil pressure control is thereby carried out continuously and accurately, irrespective of the variations peculiar to the mechanical system in the oil pressure control system and the variations in the use conditions as described above.

A preferred embodiment is of such an arrangement that both the oil pressure being regulated and the oil pressure detected in the hydraulic pressure control device are the line oil pressure.

Preferably, the oil pressure being regulated is the control oil pressure to regulate the line oil pressure, and the oil pressure detected in the hydraulic pressure control device is the line oil pressure.

Preferably, the oil pressure being regulated is the line oil pressure, and the oil pressure detected in the hydraulic pressure control device is transitional working oil pressure in oil lines positioned immediately before frictionally engaging devices.

Preferably, both the oil pressure being regulated and the oil pressure detected in the hydraulic pressure control device are the transitional working oil pressure in the oil lines positioned immediately before the frictionally engaging devices.

Ideally, the oil pressure highly accurately controlled in the hydraulic pressure control device is the transitional working oil pressure in the oil lines positioned immediately before the frictionally engaging devices. Because there are a multiplicity of frictionally engaging devices, and it is as a practical matter impossible to provide oil pressure sensors and pressure regulating valves operated in response to the command value from the computer and the like for the individual frictionally engaging device, the above-described preferred embodiment is more effective.

Preferably, the oil pressure being regulated is regulated under the control of an electromagnetic proportional valve.

Alternatively, the oil pressure being regulated is regulated by duty control.

Well known constructions may be adopted for the regulation by the control of an electromagnetic proportional valve or alternatively by duty control.

Preferably, the oil pressure is detected after a lapse of a defined period of time upon either an affirmative shift judgement or the issuing of a shift command. This is advantageous because in the oil lines of the hydraulic pressure control device, there is oil movement in large quantity during shifting, whereby the oil pressure being regulated such as the line oil pressure is temporarily fluctuated to a considerable extent.

Preferably, the oil pressure in the hydraulic pressure control device is detected a plurality of times and the mean value of the detections is set to be the effective oil pressure thus detected. With this arrangement, minor fluctuations due to pulsations of an oil pump, for example, can be absorbed.

Preferably, correction of the command value is carried out only when the result of the comparison exceeds a predetermined difference. With this arrangement, in correcting, suitable hysteresis can be provided, and needless or undesirable correction of the oil pressure being regulated and the like can be avoided.

Preferably, the predetermined difference is changed in association with at least either the vehicle speed or the engine load. With this arrangement, the hysteresis can be precisely set in accordance with the running conditions.

Preferably, when the result of the comparison exceeds the tolerance difference, a warning is issued. With this arrangement, a driver can be quickly informed of a problem such as, for example, oil leakage. Furthermore, this tolerance difference may be changed in association with at least either the vehicle speed or the engine load.

Preferably, the degree of correction of the command value is determined in association with the difference between the target value and the detected oil pressure. With this arrangement, quick response and satisfactory convergence can be made.

Additionally, according to the present invention, no limits are imposed on how the target value is set. In general, this target value is set as commensurate to the engine load such as the throttle opening, however, the target value may be set alternatively in association with a turbine torque for example.

BRIEF DESCRIPTION OF THE DRAWINGS

FIG. 3 is a chart showing the operating conditions of frictionally engaging devices in the above automatic transmission;

DESCRIPTION OF THE PREFERRED EMBODIMENTS

The present invention will be described in detail with reference to the accompanying drawings which illustrate preferred embodiments of the present invention.

Figure 1:
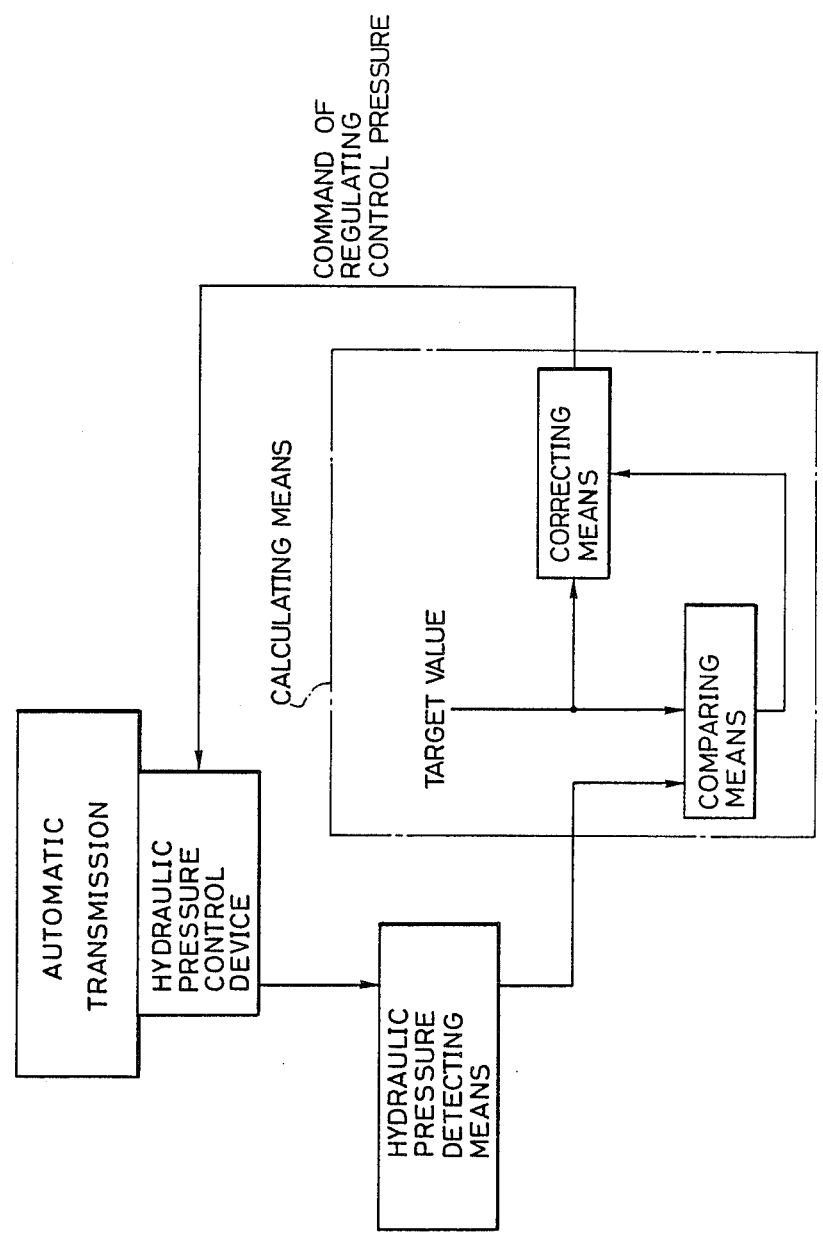
FIG. 1 is a block diagram showing the technical gist of the present invention.
Figure 2:
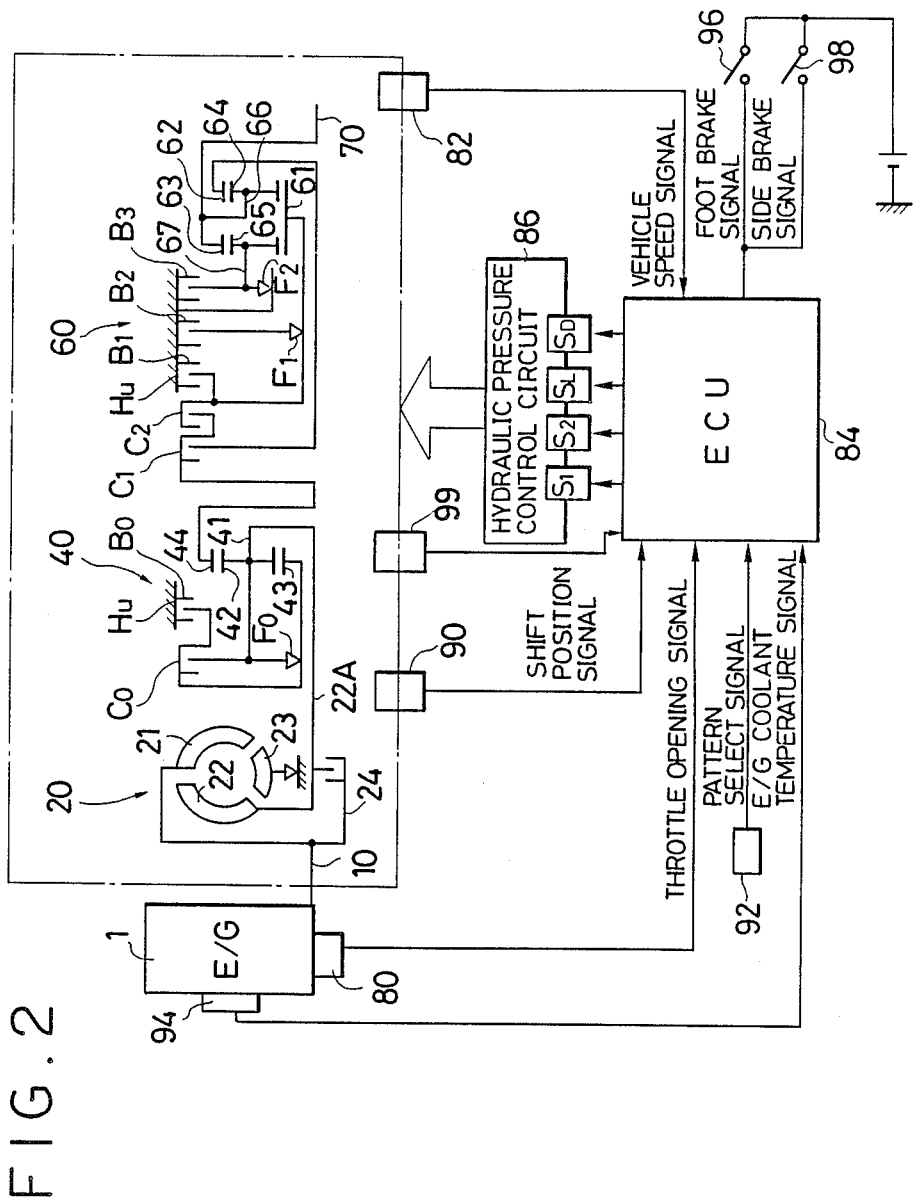
FIG. 2 is a skeleton diagram showing the general arrangement of the automatic transmission for a vehicle, to which is applied one embodiment of the hydraulic pressure control device in the automatic transmission according to the present invention.

FIG. 2 shows the outline of the general arrangement of the automatic transmission for a vehicle, to which this embodiment is applied.

The automatic transmission includes a torque converter 20, an overdrive mechanism 40 and an underdrive mechanism 60 including three forward gear stages and one backup gear stage, as transmission parts thereof.

The torque converter 20 is a type well known in the art and includes a pump 21, a turbine 22, a stator 23 and a lockup clutch 24. The pump 21 is connected to a crankshaft 10 of an engine 1. The turbine 22 is connected to a carrier 41 of planetary gear trains in the overdrive mechanism 40 through a turbine shaft 22A.

In the overdrive mechanism 40, a planetary pinion 42 rotatably supported by the carrier 41 is in meshing engagement with a sun gear 43 and a ring gear 44. A clutch C0 and a one-way clutch F0 are provided between the sun gear 43 and the carrier 41. A brake B0 is interposed between the sun gear 43 and a housing Hu.

The underdrive mechanism 60 is provided with front and rear planetary gear trains. The two planetary gear trains include a common sun gear 61, ring gears 62 and 63, planetary pinions 64 and 65, and carriers 66 and 67.

The ring gear 44 in the overdrive mechanism 40 is connected to the ring gear 62 through a clutch C1. A clutch C2 is interposed between the ring gear 44 and the sun gear 61. The carrier 66 is connected to the ring gear 63. The carrier 66 and the ring gear 63 are connected to an output shaft 70.

A brake B3 and a one-way clutch F2 are interposed between the carrier 67 and the housing Hu. A brake B2 is provided between the sun gear 61 and the housing Hu through a one way clutch F1. A brake B1 is interposed between the sun gear 61 and the housing Hu.

The automatic transmission of this embodiment is provided with a computer (ECU) 84 receiving input signals from a throttle sensor 80 for detecting a throttle opening reflecting the load of engine 1, from an output shaft sensor (a vehicle speed sensor) 82 for detecting a rotation speed of the output shaft 70, and from a pressure sensor 99 for detecting the line pressure in a hydraulic pressure control device 86 and the like. The computer 84 controls electromagnetic solenoid valves S1 and S2 (for controlling shift valves), electromagnetic solenoid valve SL (for controlling lockup clutch 24) and an electromagnetic proportional valve SD (for controlling the line pressure) in the hydraulic pressure control device 86 in accordance with a preset shift map. As a result, combinations of engagements between the clutches, the brakes and the like as shown in FIG. 3 are performed to thereby carry out shift controls. In FIG. 3, marks ○ indicate engaged conditions and marks ◎ indicate engaged conditions when only the engine torque is transmitted to the wheels (when engine brake does not occur).

Figure 4:
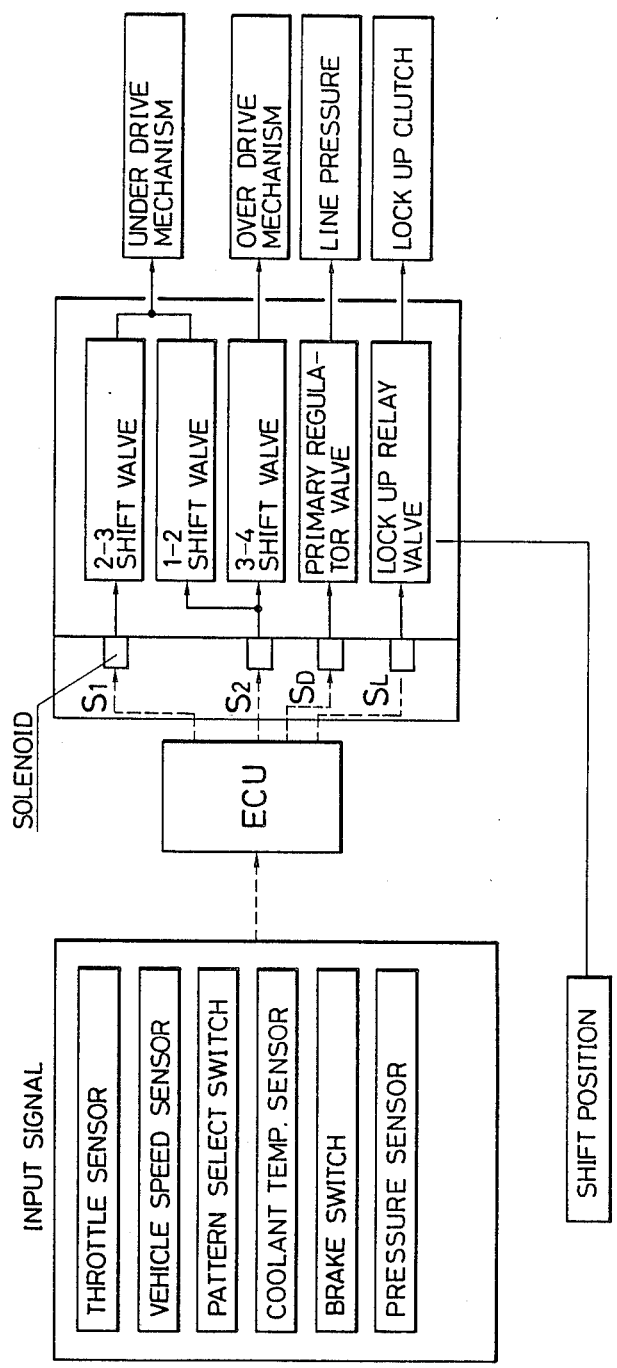
FIG. 4 is a chart showing the relationship between inputs and outputs in the control system of the above automatic transmission.

As shown in FIG. 4, the electromagnetic solenoid valve S1 controls a 2-3 shift valve. The electromagnetic solenoid valve S2 controls a 1-2 shift valve and a 3-4 shift valve. The 1-2 and the 2-3 shift valves perform the shift-control from a 1st gear stage through a 3rd gear stage in the underdrive mechanism 60. The 3-4 shift valve performs the shift-control in the overdrive mechanism 40 (shifts between 3rd gear stage and 4th gear stage). The electromagnetic solenoid valve SL performs the control of lockup clutch 24 in the torque converter 20 through a lockup relay valve. The electromagnetic proportional valve SD performs the control of the line pressure in the hydraulic pressure control device 86 through a primary regulator valve (described below).

Additionally, in FIG. 2, designated at 90 is a shift position sensor to detect the selected shift position (e.g., N (Neutral), D (Drive), R (Reverse) and the like); 92 is a pattern select switch to select E (economical running), P (power running) or the like; 94 is a coolant temperature sensor to detect the coolant temperature of the engine; 96 and 98 are brake switches to detect a foot brake or a side brake actuation, respectively.

Figure 5:
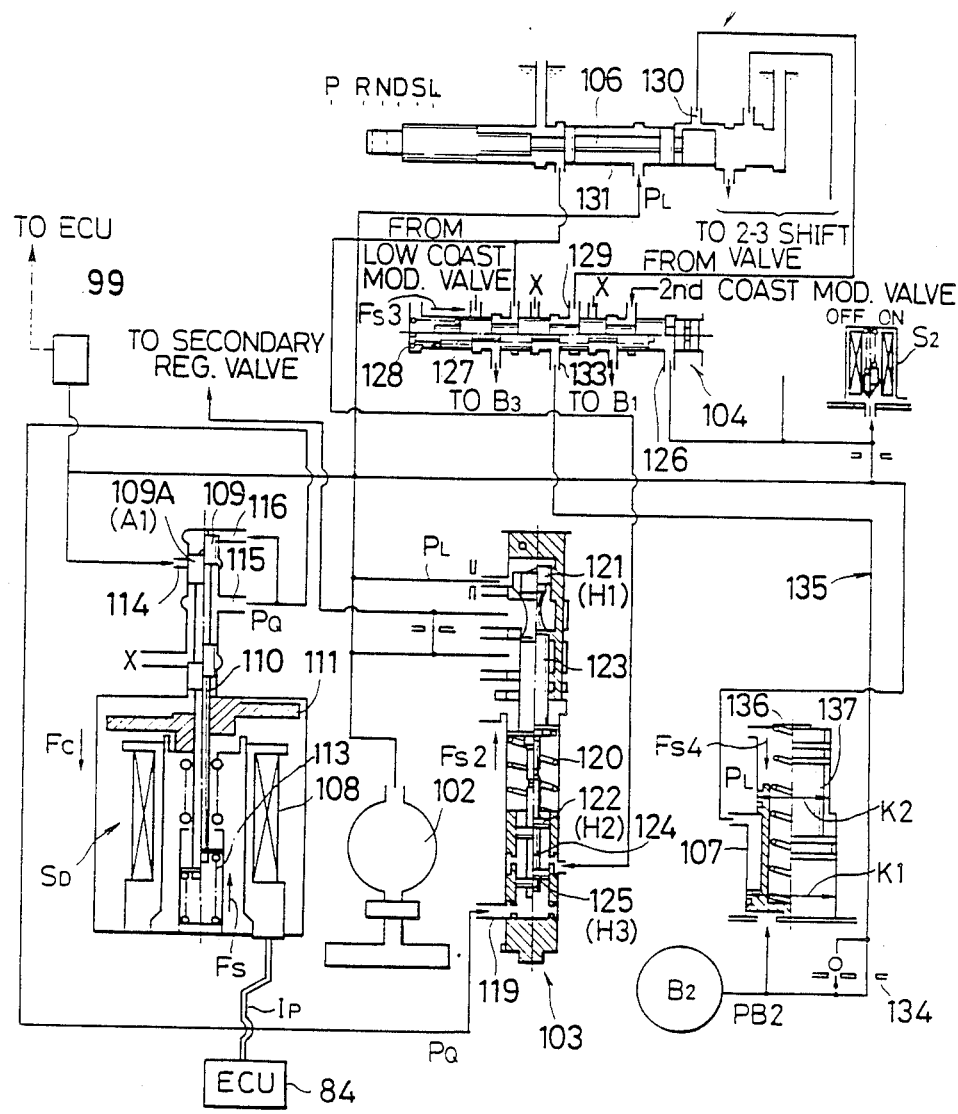
FIG. 5 is a diagram of the hydraulic pressure circuit in the essential portions of the hydraulic pressure control device in the above automatic transmission.

FIG. 5 shows the essential portions of the hydraulic pressure control device 86.

In the drawing, denoted at 99 is the pressure sensor; SD is the electromagnetic proportional valve; 102 is a pump; 103 is the primary regulator valve; 104 is the 1-2 shift valve; S2 is the electromagnetic solenoid valve; 106 is a manual valve operated by a driver and 107 is an accumulator for controlling the transitional characteristics when oil pressure is supplied to or removed from the brake B2.

The electromagnetic proportional valve SD is well known by itself and includes spools 109 and 110, coil 108, spring 113, plunger 111 and the like. The spool 110 and the plunger 111 are interconnected in the axial direction. The coil 108 applies a force Fc directed downwardly in the drawing to the plunger 111 (and the spool 110) in accordance with load current Ip from the ECU 84. In opposition to the force Fc, the spring 113 renders a force Fs to the spool 110. A discharge pressure from the pump 102 acts on a port 114. The oil pressure (control oil pressure for controlling the line oil pressure) at ports 115 and 116 is designated PQ. PQ is derived through the following equation (1), wherein A1 is the surface area of land 109a of spool 110:

$$PQ = (Fs - Fc)A1 \qquad (1)$$

As a consequence, the force Fc directed downwardly in the drawing, which is generated by the coil 108, is controlled, so that the control oil pressure PQ generated at the port 115 in accordance with equation (1) can be controlled to a desired value between 0-Fs/A1. The control oil pressure PQ corresponds to a so-called throttle pressure which has heretofore been normally generated by a throttle valve wherein a spool is mechanically drivable through a cam in proportion to a throttle opening. The control oil pressure PQ acts on a port 119 of a primary regulator valve 103 to control the line pressure.

In the primary regulator valve 103, the line pressure PL is generated in relation to the value of the control oil pressure PQ, as is conventional. Because the load current Ip to the coil 108 is controlled in association with the intake air temperature and the like, in response to a command value from the ECU 84, the line pressure PL can be desirably controlled. Additionally, the equation relating to the pressure regulation in the primary regulator valve 103 is as follows:

$$PL = \{Fs2 + (H2 - H3)PR + H3 \cdot PQ\}/H1 \qquad (2)$$

Herein Fs2 is the acting force of a spring 120, H1–H3 are face areas of lands 121, 122 and 125 of spools 123 and 124, and PR is the line pressure applied to the lands 122 and 125 when the manual valve 106 is in the reverse range.

Operation of the frictionally engaging devices are described as follows. The brake B2 will be described as typifying the frictionally engaging devices. Electromagnetic solenoid valve S2 will be described as typifying solenoid valve S1 and S2. 1-2 shift valve 104 will be described as typifying the 2-3 and 3-4 shift valves.

A single pressure of the electromagnetic solenoid valve S2 acts on port 126 of the 1-2 shift valve 104. As a consequence, a spool 127 of the 1-2 shift valve 104 slides to the right and left in the drawing in accordance with the ON-OFF operation of the electromagnetic solenoid valve S2. Spool 127 is biased to the right due to the force Fs3 from a spring 128. When spool 127 is in its rightward position, ports 133 and 129 in the 1-2 shift valve 104 are connected to each other. The line pressure PL from a port 130 of the manual valve 106 acts on the port 129 in the D (drive) range. More specifically, the ports 130, 129 and 133 are adapted to be connected to one another in the D range selecting position of the spool 131 of the manual valve 106. The port 133 is connected to the brake B2 through an oil line 135 and a check valve 134. As a consequence, in the D range, the line pressure PL is supplied to or removed from the brake B2 in accordance with the ON-OFF operation of the electromagnetic solenoid valve S2.

The oil line 135 is connected with accumulator 107, whereby the transitional working oil pressure level is controlled when the line pressure PL is supplied to or removed from the brake B2. The transitional working oil pressure PB2, i.e., the oil pressure while the accumulator 107 is working, is derivable as a function of the line pressure PL applied as the back pressure as indicated by the following equation.

$$PB2 = Fs4 + (K1 - K2)PL/K1 \qquad (3)$$

Herein Fs 4 is an acting force of a spring 136, and K1 and K2 are face areas of two lands of an accumulator piston 137.

Because the control oil pressure PQ is controlled by load current Ip, corrected by information from the oil pressure sensor 99, supplied to the electromagnetic proportional valve SD, in accordance with the above-described formula (1), the line oil pressure PL is regulated in accordance with formula (2), so that the transitional working oil pressure PB2 to the brake B2

(namely, oil pressure being directly supplied to the frictionally engaging device) can be desirably controlled even during its transitional time in accordance with formula (3).

Figure 6:
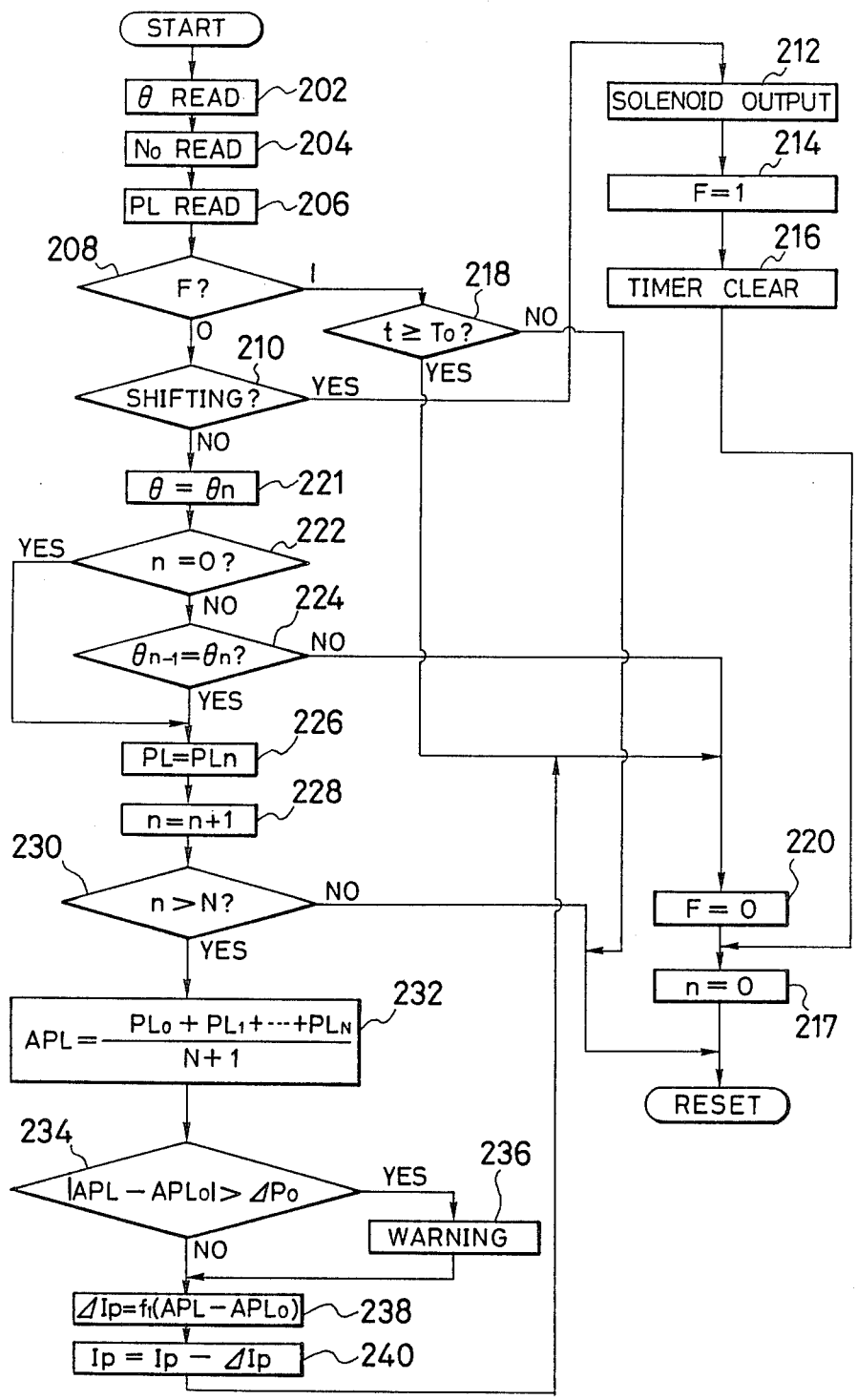
FIG. 6 is a flow chart showing a control routine of the above automatic transmission.

FIG. 6 shows the control flow logic in the device according to the above-described embodiment.

In Step 202-206, a throttle opening $\theta$, a rotation speed No of the output shaft 70 and the line oil pressure PL are read in respectively. Designated at F in Step 208 is a flag for the flow control. Since this flag F is set to zero at first, the routine proceeds to Step 210.

In Step 210, a shift judgment (whether or not a shift is to occur) is made by use of a shift chart, for example, from the throttle valve opening $\theta$ and the rotation speed No of the output shaft (vehicle speed) wherein shifts occur as commensurate to a difference between a target shift position and an actual shift position. When an affirmative shift judgment is made, the routine proceeds to Step 212, where a shift output is performed. In Step 214, the flag F is set to one. In Step 216, a timer is cleared (started), and thereafter, in Step 217, a count N is cleared and reset.

Subsequently, the routine proceeds to Steps 202-208. As flag F is set to one, Step 218 is then executed. In Step 218, judgment is made as to whether a defined period of time To from a timer start in the Step 216 has elapsed or not. Until an elapsed time t reaches the defined time To, reset is repeated and feedback control is not performed. When the elapsed time t has reached the defined time To, the flag F is set to zero again in Step 220, and thereafter, the routine proceeds through Step 217 and reset is made. The purpose of the defined period of time To provided after a shift command, and before the feedback control as described above is resumed, is that in general, the line oil pressure and the like become unstable at this time, and the unstable line oil pressure and the like are not suitable for the precision feedback.

On the other hand, when a negative shift judgment is made in Step 210, the throttle opening $\theta$ is set to be $\theta$n in Step 221, and judgment as to whether a count n is zero or not is made in Step 222. When the count n is not zero, judgment is made in Step 224 as to whether the current throttle opening $\theta$n is equal to preceding throttle opening $\theta$n−1 or not, i.e. whether there is a change in the throttle opening. When there is no change, or n=0 in the aforesaid Step 222, the line oil pressure PL is set to be PLn as it is (Step 226). When there is a change in the throttle opening $\theta$, the flag F and the count n are cleared, and thereafter, resets are made. In other words, when the throttle opening is changed, the feedback control is not performed.

After the line oil pressure PL is made to be PLn in Step 226, n is counted up in Step 228, and judgment as to whether or not the count n is larger than a predetermined value N is made in Step 230. Here, N is a constant. When n is smaller than the predetermined value N, reset is made. When n becomes larger than the predetermined value N, the line oil pressure PL is averaged as APL through the following formula in Step 232.

$$APL = (PLo + PL \ldots + PLn)/(N+1) \quad (4)$$

Figures 7, 8:
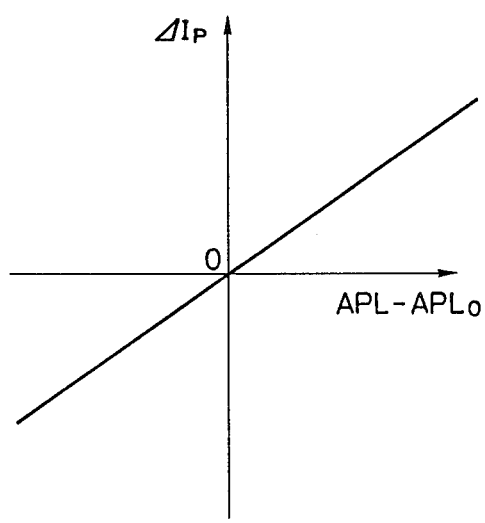
FIG. 7 is a chart showing examples of the target values APLo and the tolerance differences $\Delta$Po.
FIG. 8 is a chart showing the relationship between (APL-APLo) and a correction current value $\Delta$Ip of the electromagnetic proportional valve.

In Step 234, judgment as to whether or not the difference between this mean value APL and APLo is larger than the tolerance difference $\Delta$Po is made. Here, APLo is the target value and preset as a function of the vehicle speed and the throttle opening. FIG. 7 shows this relation indirectly. In FIG. 7, APLo is shown as a function of the throttle opening $\theta$ and the gear stages. Since the gear stage is defined by the vehicle speed at each throttle opening, FIG. 7 shows APLo in association with the vehicle speed. Furthermore, the tolerance difference $\Delta$Po is made to be a function of the vehicle speed and the throttle opening, which are combinedly shown in FIG. 7.

When an affirmative judgement is made in Step 234, a warning is issued in Step 236, and the routine proceeds to Step 238. When a negative judgement is made in Step 234, the routine proceeds to Step 238 directly, where the correction difference $\Delta$Ip of the current Ip outputted to an electromagnetic proportional valve SD is determined as a function of (APL−APLo), and correction of the current Ip is made in Step 240. Additionally, FIG. 8 shows the relationship between (APL−APLo) and $\Delta$Ip. Subsequently, the flag F and the count n are cleared, and thereafter, resets are made. In this flow, correction of Ip occurs regardless of the magnitude of the difference (APL−APLo) and fine correction is made as commensurate to this difference.

According to this embodiment, the correction of the current Ip outputted to the electromagnetic proportional valve SD is conducted after a lapse of a predetermined period of time To from the shift output and limited to the case where there is no change in the throttle opening $\theta$. As a result, the feedback control is performed only in comparatively stabilized conditions, and needless or undesirable changes in Ip can be prevented from occurring. Furthermore, sample values of number N Are averaged in detecting the line oil pressure, so that the adverse influence of pulsations of the pump and the like can be eliminated. Further, when the difference between the detected oil pressure and the target value exceeds the tolerance difference warning is issued so that the driver can be quickly informed of any trouble such as for example oil leakage, thereby enabling a suitable inspection and the like.

Figure 9:
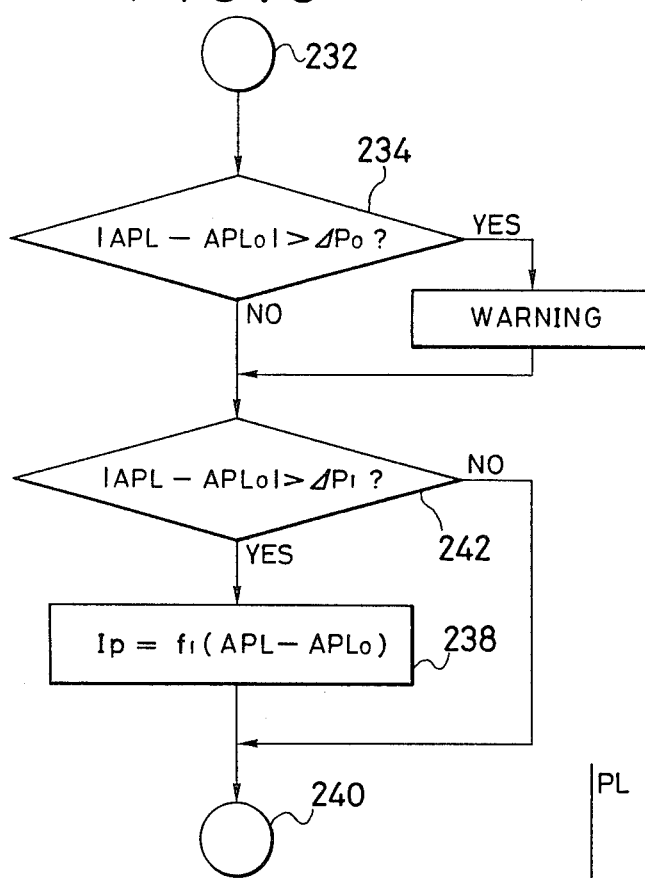
FIG. 9 is a flow chart showing part of another control routine.

Alternatively, the routine of Steps 234–240 can be changed to the one shown in FIG. 9. In this routine, Step 242 is provided between Step 234 and Step 238, where judgment is made as to whether or not an absolute value of the difference between APL and APLo is larger than a predetermined difference $\Delta$P1, and, only when the absolute value is larger than the predetermined difference, does the routine proceed to Step 238 and 240, where correction of the command value is made. With this arrangement, hysteresis of a certain degree can be provided and too fine a correction can be avoided, so that the oil pressure stability can be improved. As in the previous routine, the tolerance difference $\Delta$P1 is made, for example, to be a function of the vehicle speed and the throttle opening.

Figure 10:
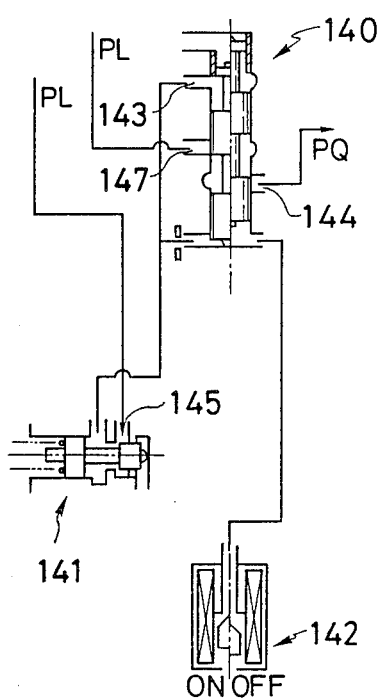
FIG. 10 is a diagram showing a hydraulic pressure circuit in the essential portions to illustrate another means for changing the line oil pressure.

In the above embodiment, the means obtained by combining the electromagnetic proportional valve with the primary regulator valve, as the line oil pressure generating valve, has been adopted as the means for controlling the oil pressure. However, according to the present invention, the specific means used for controlling the oil pressure need not be so limited. For example, as shown in FIG. 10, such an arrangement may be adopted that a regulating valve 141, a duty control valve 140 and a high speed electromagnetic valve 142 are provided and the duty ratio of the high speed electromagnetic valve 142 is controlled, whereby the regulated oil pressure acting on a port 143 of the ducy control valve 140 is desirably regulated as PQ for a port 144. In this case, a port 147 is connected to an oil line point 136 shown in FIG. 5, the port 144 is connected to the port 119 or the like of the primary regulator valve 103, and further, a port 145 of regulating valve 141 is connected to the oil line point 136. Details for the regulation of oil pressure by this duty ratio control are disclosed in Japanese Utility Model Application Publication No. 38186/1983 and Japanese Patent Laid-Open No. 24246/1981 which disclosures are incorporated herein by reference.

What is claimed is:

1. A hydraulic pressure control device in an automatic transmission, provided with a means for regulating control oil pressure in response to a command value from a calculating means, comprising:
   means for detecting whether or not a defined period of time has passed since an affirmative shift judgment by said calculating means;
   means for detecting whether or not engine load is substantially constant
   means for detecting control oil pressure in said hydraulic pressure control device when said defined period of time has passed and said engine load is substantially constant and generating a detected oil pressure value;
   means for comparing the detected oil pressure value with a target value and producing a comparison value; and
   means for correcting the command value of said calculating means in accordance with the comparison value.

2. The hydraulic pressure control device in an automatic transmission as set forth in claim 1, wherein both the oil pressure being regulated and the oil pressure detected in said hydraulic pressure control device are line oil pressure.

3. The hydraulic pressure control device in an automatic transmission as set forth in claim 1, wherein the oil pressure being regulated is control oil pressure to regulate the line oil pressure, and the oil pressure detected in said hydraulic pressure control device is the line oil pressure.

4. The hydraulic pressure control device in an automatic transmission as set forth in claim 1, wherein the oil pressure being regulated is regulated under the control of an electromagnetic proportional valve.

5. The hydraulic pressure control device in an automatic transmission as set forth in claim 1, wherein the oil pressure being regulated is regulated by duty control.

6. The hydraulic pressure control device in an automatic transmission as set forth in claim 1, wherein the oil pressure in said hydraulic pressure control device is detected a plurality of times and the mean value of the detections is set to be the effective oil pressure thus detected.

7. The hydraulic pressure control device in an automatic transmission as set forth in claim 1, wherein said target value is set as a function of a vehicle speed and an engine load.

8. The hydraulic pressure control device in an automatic transmission as set forth in claim 1, wherein, only when the comparison value exceeds a predetermined difference, correction of the command value is made.

9. The hydraulic pressure control device in an automatic transmission as set forth in claim 8, wherein said predetermined difference is changed in association with at least either a vehicle speed or an engine load.

10. The hydraulic pressure control device in an automatic transmission as set forth in claim 1, wherein, when the comparison value exceeds a tolerance difference, a warning is issued.

11. The hydraulic pressure control device in an automatic transmission as set forth in claim 10, wherein said tolerance difference is changed in association with at least either a vehicle speed or an engine load.

12. The hydraulic pressure control device in an automatic transmission as set forth in claim 1, wherein the degree of correction of said command value is determined in association with the difference between said target value and the detected oil pressure.

13. A hydraulic pressure control device in an automatic transmission, provided with a means for regulating control oil pressure in response to a command value from a calculating means, comprising:
   means for detecting whether or not a defined period of time has passed since issuance of a shift command by said calculating means;
   means for detecting whether or not engine load is substantially constant;
   means for detecting control oil pressure in said hydraulic pressure control device when said defined period of time has passed and said engine load is substantially constant and generating a detected oil pressure value;
   means for comparing the detected oil pressure value with a target value and producing a comparison value; and
   means for correcting the command value of said calculating means in accordance with the comparison value.

* * * * *